(12) United States Patent
Tanaka et al.

(10) Patent No.: US 12,272,831 B2
(45) Date of Patent: Apr. 8, 2025

(54) FASTENING STRUCTURE

(71) Applicant: VEHICLE ENERGY JAPAN INC., Hitachinaka (JP)

(72) Inventors: Nobuyoshi Tanaka, Hitachinaka (JP); Masato Nagata, Hitachinaka (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 1015 days.

(21) Appl. No.: 17/047,780

(22) PCT Filed: Feb. 7, 2019

(86) PCT No.: PCT/JP2019/004418
§ 371 (c)(1),
(2) Date: Oct. 15, 2020

(87) PCT Pub. No.: WO2020/066050
PCT Pub. Date: Apr. 2, 2020

(65) Prior Publication Data
US 2021/0159563 A1 May 27, 2021

(30) Foreign Application Priority Data
Sep. 28, 2018 (JP) .................. 2018-183146

(51) Int. Cl.
*H01M 50/166* (2021.01)
*H01M 50/103* (2021.01)
(Continued)

(52) U.S. Cl.
CPC ....... *H01M 50/166* (2021.01); *H01M 50/103* (2021.01); *H01M 50/176* (2021.01);
(Continued)

(58) Field of Classification Search
CPC ............. H01M 50/166; H01M 50/103; H01M 50/176; H01M 50/55; H01M 50/553;
(Continued)

(56) References Cited

U.S. PATENT DOCUMENTS

2011/0200870 A1* 8/2011 Kim ................... H01M 50/567
429/179
2012/0214053 A1* 8/2012 Kim ................... H01M 50/147
429/182

(Continued)

FOREIGN PATENT DOCUMENTS

DE 112016006086 T5 9/2018
JP 2005-056649 A 3/2005
(Continued)

OTHER PUBLICATIONS

Japanese Office Action issued on Nov. 24, 2021 for Japanese Patent Application No. 2020-547907.
(Continued)

*Primary Examiner* — Christian Roldan
(74) *Attorney, Agent, or Firm* — Volpe Koenig (57) ABSTRACT

A fastening structure includes an insulation member disposed between a fastening member and a fastened member, and has a configuration wherein the insulation member is in close contact with the fastening member and the fastened member so that an adequate sealing area is secured. The fastening structure includes: a case; a fastening member extending through a through hole in the case; and an insulation member between the fastening member and the case. The fastening member includes a portion exposed from the case, and a penetrating portion extending through the through hole. The expose portion includes a confronting surface opposed to an outside surface of the case via the insulation member. A compression region is located, and defines a minimum distance between, the confronting sur- (Continued)

face and the outside surface. A projection is disposed at place not overlapping with the compression region.

7 Claims, 5 Drawing Sheets

(51) Int. Cl.
*H01M 50/176* (2021.01)
*H01M 50/55* (2021.01)
*H01M 50/553* (2021.01)
*H01M 50/564* (2021.01)

(52) U.S. Cl.
CPC ......... *H01M 50/55* (2021.01); *H01M 50/553* (2021.01); *H01M 50/564* (2021.01)

(58) Field of Classification Search
CPC ........... H01M 50/564; H01M 10/0431; H01M 50/15; Y02P 70/50; Y02E 60/10
USPC ....................................................... 429/176
See application file for complete search history.

(56) References Cited

U.S. PATENT DOCUMENTS

| | | | |
|---|---|---|---|
| 2017/0214030 A1* | 7/2017 | Tsutsumi | ............ H01M 50/55 |
| 2018/0205044 A1 | 7/2018 | Urushihara | |
| 2019/0006639 A1 | 1/2019 | To | |

FOREIGN PATENT DOCUMENTS

| | | |
|---|---|---|
| JP | 2016-173907 A | 9/2016 |
| JP | 2016-207510 A | 12/2016 |
| JP | 2017-130386 A | 7/2017 |

OTHER PUBLICATIONS

Japanese Office Action issued on Apr. 28, 2022 for Japanese Patent Application No. 2020-547907.
Extended European Search Report issued on Nov. 10, 2021 for European Patent Application No. 19865185.3.
Chinese Office Action issued on Dec. 16, 2022 for Chinese Patent Application No. 201980026428.4.
Chinese Office Action issued on Aug. 29, 2022 for Chinese Patent Application No. 201980026428.4.

* cited by examiner

FASTENING STRUCTURE

TECHNICAL FIELD

The present invention relates to a fastening structure including a resin member interposed between a fastening member and a fastened member.

BACKGROUND ART

In devices such as lithium ion secondary batteries and oil-pressure or hydraulic pressure machines, an inside part and an outside part must be isolated from each other so as to prevent the leakage of liquid such as an electrolyte solution, oil or water. On the other hand, such devices often include parts interconnecting the inside part and the outside part such as terminals electrically interconnecting the inside part and the outside part. This leads to an inevitable formation of boundaries between these parts and a case, dictating the need to close these areas with resin or the like.

For instance, PTL 1 discloses an electric storage device which includes a gasket made of a resin member interposed between an external terminal as the fastening member and a case as the fastened member. In the electric storage device, the external terminal includes a projection on its confronting surface opposed to the case while the gasket body at a region corresponding to the projection also includes a projection. By virtue of the above configuration, a surface pressure on the gasket is increased so that airtightness between the external terminal and the case is increased.

CITATION LIST

Patent Literature

PTL 1: Japanese Patent Application Laid-Open No. 2017-130386

SUMMARY OF INVENTION

Technical Problem

According to PTL 1, the configuration is made such that the projection formed on the gasket is further compressed in a gasket compression region which defines a minimum distance between the external terminal and the case. Hence, the member of the compressed gasket is circumferentially displaced. At this time, the member of the gasket is prone to move toward space free from the case rather than following the projection formed on the external terminal. In effect, a seal portion is often defined by only an area where the distance between the external terminal and the case is minimum. This results in a problem that an adequate sealing area cannot be obtained.

Accordingly, it is an object of the present invention to provide a fastening structure adapted to secure the adequate sealing area by preventing the member of the compressed gasket from being circumferentially displaced as described above.

Solution to Problem

According to an aspect of the present invention for achieving the above object, a fastening structure includes: a case; a fastening member extending through a through hole formed in the case; and an insulation member (resin member) interposed between the fastening member and the case, and has a configuration wherein the fastening member includes an exposure portion exposed from the case and a penetrating portion extending through the through hole. The exposure portion includes a confronting surface opposed to an outside surface of the case via the insulation member. A compression region defining a minimum distance between the confronting surface and the outside surface is provided at one location between the confronting surface and the outside surface. A projection from the confronting surface toward the outside surface or from the outside surface toward the confronting surface is disposed at place not overlapped with the compression region. A projection height of the projection is lower than a compression projection height of the compression region.

Advantageous Effects of Invention

The present invention can provide the fastening structure adapted to secure the adequate sealing area by preventing the member of the compressed gasket from being circumferentially displaced.

DESCRIPTION OF EMBODIMENTS

The examples of the present invention will hereinbelow be described with reference to the accompanying drawings.

Example 1

Figure 1:
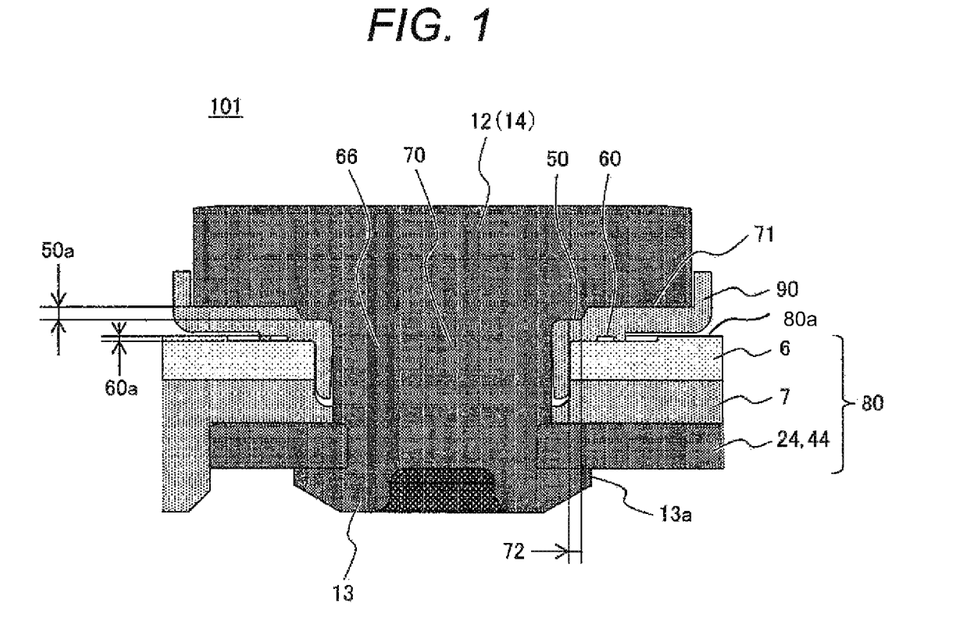
FIG. 1 is a sectional view of a fastening structure according to Example 1 hereof.

FIG. 1 is a sectional view of a fastening structure 101.

A fastening structure 101 of the embodiment is used in devices, such as oil-pressure machines and hydraulic pressure machines, which are required to maintain the airtightness such as to obviate the leakage of a content such as liquid sealed in the case.

The fastening structure 101 includes: a fastening member 70, a fastened member 80 fastened by the fastening member 70, and a resin member 90 interposed between the fastening member 70 and the fastened member 80.

The fastened member 80 is, for example, a case containing a liquid therein or a lid for sealing the case and is composed of one or more members. The fastened member 80 includes a through hole.

The fastening member 70 includes: a penetrating portion 66 extending through the through hole of the fastened member 80; exposure portions 12 (14) disposed at ends of the penetrating portion 66 and holding the fastened member 80 on the opposite sides thereof; and a crimp portion 13. The exposure portion 12 (14) is located on the outer side, also referred to herein as the outer surface 80a, of the case while the crimp portion 13 is located on the inner side of the case.

The fastened member 80 is fastened by the fastening member 70 by taking the steps of inserting the crimp portion 13 and the penetrating portion 66 into the through hole from the outside of the case, expanding the crimp portion 13 radially of the through hole and press working the crimp portion. A metal material such as an aluminum alloy can be used for forming the fastening member 70.

The exposure portion 12(14) has a larger diameter than the penetrating portion 66. Namely, the exposure portion extends farther outward than the penetrating portion 66 in a radial direction with respect to the axis of the penetrating portion 66. As crimped by the fastened member 80, the crimp portion 13 similarly expands farther outward than the penetrating portion 66. In this configuration, the fastened member 80 is held between the exposure portion 12(14) and the crimp portion 13.

As shown in FIG. 1, for example, the resin member 90 is disposed between the exposure portion 12(14) and the fastened member 80 or between the crimp portion 13 and the fastened member 80. The resin member 90 is provided for the purpose of retaining isolation between the fastening member 70 and the fastened member 80 or for keeping the airtightness of the case. The resin member 90 is formed by injection molding or press molding a resin material such as polybutylene terephthalate, polyphenylene sulfide or perfluoroalkoxy alkane.

In a case where the resin member 90 is interposed between the exposure portion 12(14) and the fastened member 80 as shown in FIG. 1, the exposure portion 12 defines a confronting surface 71 as opposed to an outside surface of the fastened member 80 via the resin member 90. Sealing property at this area is important for sealing off the inside of the case from the outside of the case. It is therefore necessary for a boundary between the exposure portion 12(14) and the fastened member 80 to be effectively sealed by the resin member 90.

A compression region 72 which defines a minimum distance between the confronting surface 71 of the exposure portion 12(14) and the fastened member 80 is provided at one location. The sealing property is principally generated at this compression region 72. With a large number of compression regions 72, a repulsion load of the resin member 90 cannot be obtained adequately. It is therefore preferred that a small number of compression region is provided. Or more preferably, the compression region is provided at one location. The sealing property can be adjusted by adjusting a compression projection height 50a of a compression projection 50.

The compression region 72 is located inwardly from an end 13a of the crimp portion 13 (on the inner side in the radial direction of the penetrating portion 66). Thus, a crimping force is applied to the compression region 72 so that the sealing property can be generated effectively. Fastening power derived from crimping stably works on a region which extends from an axial center of the penetrating portion 66 of the fastening member 70 to an end 13a of the crimp portion 13 in the radial direction with respect to the axis of the penetrating portion 66 of the fastening member 70. The existence of the compression region 72 in the relevant region allows the resin member 90 to be stably compressed over a long period of time.

From the standpoint of the long-term sealing property, it is necessary to deal with the possibility of vibrational impacting on products. In a case where the fastening structure 101 of the electric storage device is subjected to vibrational impacting, small gaps are likely to occur at places between the fastening member 70 and the resin member 90 and between the lid and the resin member 90 on the outer side of the end 13a of the crimp portion 13 in the radial direction with respect to the axis of the penetrating portion 66. This is because the crimping force stably works on an area on the inner side of the end 13a of the crimp portion 13 and hence, an area on the outer side of the end 13a of the crimp portion 13 is more susceptible to the many vibrational impacting than the area on the inner side. It is therefore desirable that a projection 60 slightly compresses the resin member 90 on the outer side of the end 13a of the crimp portion 13. Even under the vibrational impacting, the action of the slight compression is effective to obviate the occurrence of the small gaps.

The fastened member 80 is provided with the resin member and the projection 60 projecting toward the confronting surface 71 on a confronting-surface-71 side thereof. The projection 60 is located at place not overlapped with the compression region 72, such as a place on the outer side of the compression region 72 in the radial direction with respect to the axis of the penetrating portion 66.

Furthermore, the projection 60 is disposed at place on the radially outer side of the end 13a of the crimp portion 13. This is effective to generate a material-thickness decrease preventing effect while interfering with the sealing effect by the compression region 72 as little as possible.

According to the above-described configuration, because of the action of the slight compression region generated by the above-described projection 60, the resin member 90 compressed by the compression region 72 is prevented from being displaced toward the outer side (material-thickness decrease) particularly in the radial direction with respect to the axis of the penetrating portion 66. Hence, the fastening member 70 and the resin member 90 as well as the fastened member 80 and the resin member 90 are held in tight contact so that the adequate sealing area is secured. The material-thickness decrease prevention quantity can be regulated by adjusting a projection height 60a.

In a case where the projection height 60a is too large, or for example where a distance between the projection 60 and the confronting surface 71 is less than a distance between the confronting surface and the fastened member 80 in the compression region 72, there exists more than one compression region 72 which defines a minimum distance between the fastening member 70 and the lid 6. Thus, the resin member 90 may not undergo adequate elastic deformation, resulting in possible sealing property degradation due to dispersed repulsion load. It is therefore preferred to define the distance between the projection 60 and the confronting surface 71 to be not less than the distance between the confronting surface 71 and the fastened member 80 in the compression region 72.

With the existence of a plurality of compression regions 72, the repulsion load resulting from the compression of the resin member 90 increases but the material-thickness decrease of the resin member 90 becomes more noticeable. In terms of seal surface pressure obtained by dividing the repulsion load by the area of the compression region 72, a configuration including a single compression region 72 provides more favorable result despite the increased repulsion load. What is more, if the repulsion load is too high, load on the crimp portion 13 of the fastening member 70 increases, resulting in the distortion of crimp diameter or dictating the need to increase load during crimping. Consequently, the fastening member 70 buckles, resulting in fastening failure. Thus, the inventors have reached conclusion that the compression region 72 which defines the minimum distance between the fastening member 70 and the lid 6 is desirably provided at one location. Accordingly, it is desirable that the projection height 60a of the projection 60 is lower than the compression projection height 50a of the compression projection 50.

While FIG. 1 illustrates the fastening structure 101 as an example, the fastening structure 101 can effectively applied to a secondary battery such as a lithium ion secondary battery.

In this case, the fastening member 70 is, for example, a positive-electrode external terminal (exposure portion 14) or a negative-electrode external terminal (exposure portion 12). The fastened member 80 is, for example, a laminate of the lid (battery lid) 6 and a negative-electrode current collector plate 24 (positive-electrode current collector plate 44) with an insulating plate 7 interposed therebetween. The resin member (insulation member) 90 is a gasket.

The positive-electrode external terminal or the negative-electrode external terminal as the fastening member 70 has a role to play as a terminal for electrically interconnecting a wound electrode group (electric storage device) 3 and an outside of a battery case 1. In order to provide an electric pathway, therefore, the positive-electrode external terminal or the negative-electrode external terminal is required to maintain insulation properties with respect to the battery lid 6. The positive-electrode external terminal or the negative-electrode external terminal is mounted to the battery lid 6 via a gasket 5 (resin member 90) and the insulating plate 7. Since the external terminal is a separate member, this part is formed with a few pathways interconnecting the inside and the outside of the battery case 1. It is therefore crucial for the external terminal to maintain the sealing property by means of the gasket 5.

As will be described hereinafter with reference to FIG. 3, a wound electrode group 3 is accommodated in the battery case 1. The wound electrode group 3 is electrically connected to the outside of the secondary battery by means of the positive-electrode external terminal and the negative-electrode external terminal as the fastening member 70; and the positive-electrode current collector plate 44 and the negative-electrode current collector plate 24 electrically connected to the external terminals. The battery lid 6 is required to be insulated from the positive-electrode external terminal or the negative-electrode external terminal, and the positive-electrode current collector plate 44 or the negative-electrode current collector plate 24 which is electrically connected to the external terminal. Therefore, the gasket 5 as the resin member 90 is disposed between the battery lid 6 and the positive-electrode external terminal or between the battery lid 6 and the negative-electrode external terminal, while the insulating plate 7 is disposed between the battery lid 6 and the positive-electrode current collector plate 44 or between the battery lid 6 and the negative-electrode current collector plate 24.

Similarly to the fastened member 80 such as the battery lid 6, the gasket 5 includes a through hole which is penetrated by the penetrating portion 66 of the negative-electrode external terminal exposure portion 12 or the positive-electrode external terminal exposure portion 14. The gasket 5 includes a portion disposed between the penetrating portion 66 and a through-hole inside wall of the battery lid 6, and a portion disposed between the negative-electrode external terminal exposure portion 12 and an outside surface of the battery lid 6, or between the positive-electrode external terminal exposure portion 14 and the outside surface of the battery lid 6. The projection for preventing the material-thickness decrease is disposed at the latter portion. Although the projection for preventing the material-thickness decrease may also be disposed at the former portion, it is preferred to dispose the projection for preventing the material-thickness decrease at the latter portion from the standpoint of the easiness of parts processing and assembly work as in FIG. 1.

As in FIG. 1 above, in the configuration where the resin member 90 is interposed between the confronting surface 71 of the exposure portion 12 (14) and the outside surface of the fastened member 80, the projection 60 is disposed on the outer side of the compression region 72 which defines the minimum distance between the confronting surface 71 and the outside surface of the fastened member 80. With this, a part of the resin member 90 displaced outward as compressed by the compression region 72 is prevented by the projection 60 from being displaced further outward. In this way, the fastening structure 101 improved in the sealing property is provided.

Figure 2:
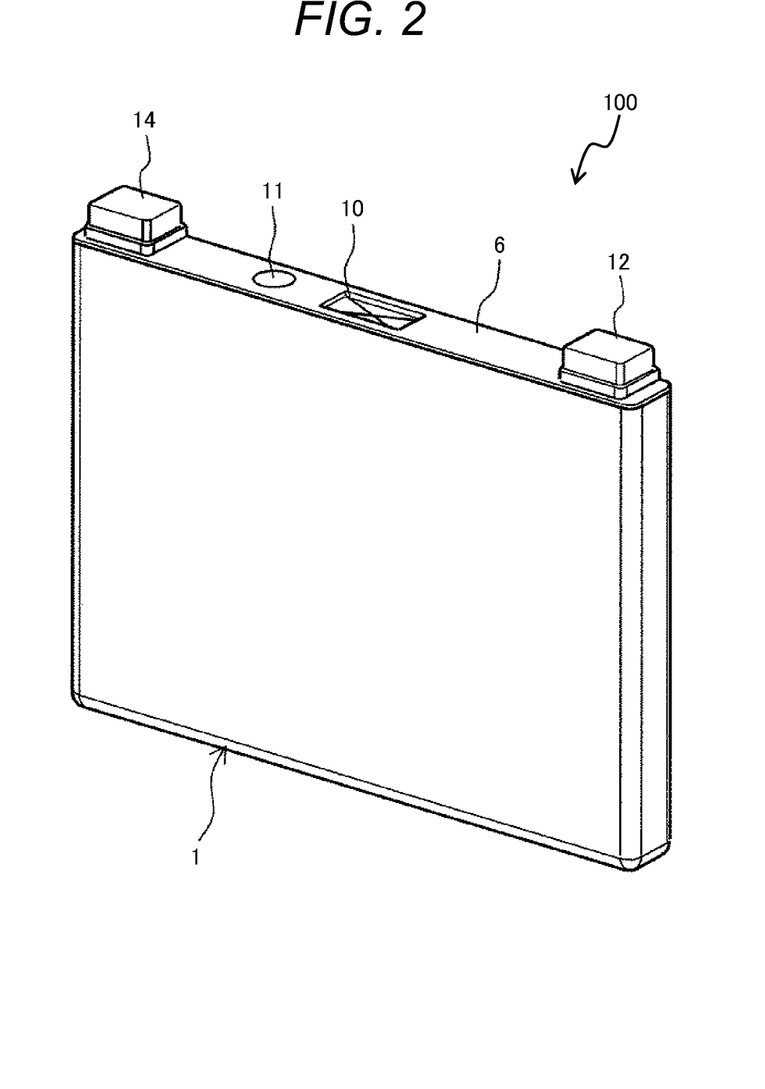
FIG. 2 is an external perspective view of an electric storage device.

FIG. 2 is an external view showing a secondary battery of a case where the fastening structure 101 is applied to a secondary battery 100.

The secondary battery 100 contains the electrolyte solution in the case. The secondary battery is required to maintain the airtightness of the inside so as to prevent the leakage of the electrolyte solution. The inside of the case can be sealed by applying the fastening structure 101 to the electric storage device (secondary battery).

The secondary battery 100 includes the battery case 1 and the battery lid 6. The battery case 1 and the battery lid 6 are made of a metal material such as an aluminum alloy and are formed by deep drawing or press working the material.

The wound (electrode) group 3 (FIG. 3) is installed in the battery case 1. An aperture 1a of the battery case 1 is closed by the battery lid 6. The battery lid 6 is substantially shaped like a rectangular flat plate. The battery lid is so welded as to close the aperture 1a of the battery case 1, thus sealing the battery case 1. The battery lid 6 is provided with the positive-electrode external terminal exposure portion 14 and the negative-electrode external terminal exposure portion 12 which are fixed to the battery lid 6 by the gasket (insulation member) 5 formed by insert molding or press molding. The wound (electrode) group 3 is electrically charged by means of the positive-electrode external terminal exposure portion 14 and the negative-electrode external terminal exposure portion 12, and supplies electric power to an external load. The battery lid 6 is integrally mounted with a gas exhaust valve 10. When pressure in the battery case rises, the gas exhaust valve 10 is opened to exhaust the gas therein and to lower the pressure in the battery case. In this way, the safety of the secondary battery 100 is secured.

Figure 3:
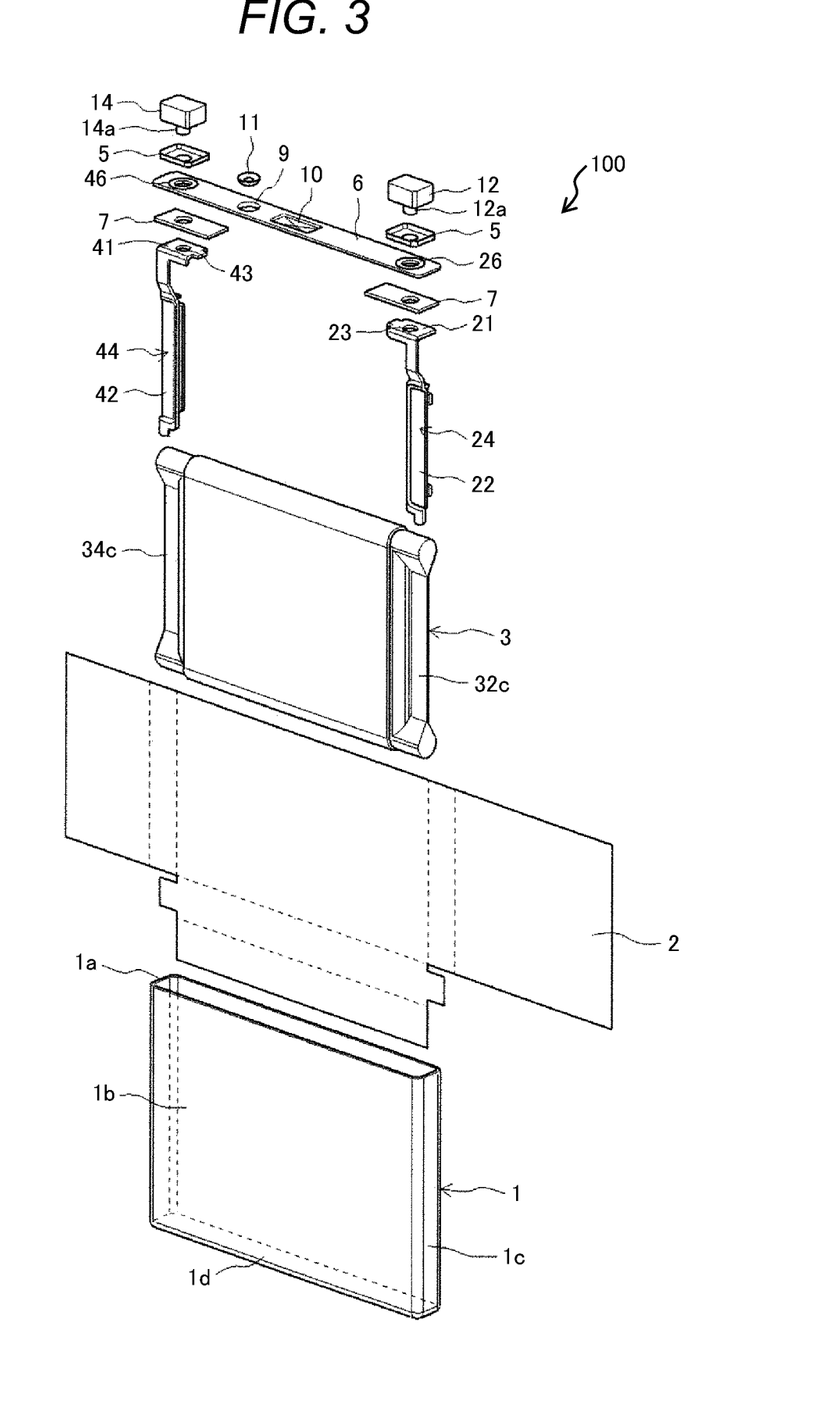
FIG. 3 is a disassembled perspective view of the electric storage device.

FIG. 3 is a disassembled perspective view of the secondary battery 100.

The battery case 1 of the secondary battery 100 includes: a rectangular bottom surface 1d; wide side surfaces 1b upstanding from a pair of long sides of the bottom surface 1d; narrow side surfaces 1C upstanding from a pair of short sides of the bottom surface 1d; and the aperture 1a opening upward from upper ends of the wide side surfaces 1b and the narrow side surfaces 1C. The wound (electrode) group 3 is accommodated in the battery case 1 via an insulating protection film 2.

The wound (electrode) group 3 is composed of a belt-like electrode wound into a flat configuration which includes a pair of curved portions having a semicircular cross section and opposed to each other, and a planar portion continuously formed between the pair of curved portions. The wound (electrode) group 3 is inserted in the battery case 1 as follows. One of the curved portions is first inserted in the battery case 1 to be placed in an opposed relation to the bottom surface 1d so that a winding axis of the wound electrode is aligned with a widthwise direction of the battery case 1 and the other curved portion is located on the side of the aperture 1a.

A positive-electrode foil exposure portion 34c of the wound (electrode) group 3 is electrically connected to the positive-electrode external terminal exposure portion 14 at the battery lid 6 via the positive-electrode current collector plate 44. A negative-electrode foil exposure portion 32c of the wound (electrode) group 3 is electrically connected to the negative-electrode external terminal exposure portion 12 at the battery lid 6 via the negative-electrode current collector plate 24. Thus, the electric power is supplied from the wound (electrode) group 3 to the external load via the positive-electrode current collector plate 44 and the negative-electrode current collector plate 24 while the wound (electrode) group 3 is charged with externally generated electric power supplied via the positive-electrode current collector plate 44 and the negative-electrode current collector plate 24.

The gasket 5 and the insulating plate 7 are disposed at the battery lid 6 in order to electrically insulating the positive-electrode current collector plate 44 and the negative-electrode current collector plate 24 as well as the positive-electrode external terminal exposure portion 14 and the negative-electrode external terminal exposure portion 12 from the battery lid 6, respectively. After injecting the electrolyte solution into the battery case 1 through a liquid injection port 9, the liquid injection port 9 is sealed by laser welding a liquid tap 11 to the battery lid 6. Thus, the flat wound type secondary battery 100 is hermetically sealed.

Examples of a material for forming the positive-electrode current collector plate 44 include aluminum alloys while examples of a material for forming the negative-electrode current collector plate 24 include copper alloys. Examples of a material for forming the gasket (insulation member) 5 include resin materials having insulative properties such as polybutylene terephthalate, polyphenylene sulfide and perfluoroalkoxy alkane.

The battery lid 6 is formed with the liquid injection port 9 for injecting the electrolyte solution into the battery case. After injecting the electrolyte solution into the battery case, the liquid injection port 9 is sealed with the liquid tap 11. An example of a usable electrolyte solution injected into the battery case include a non-aqueous electrolyte solution including lithium salt such as lithium hexafluorophosphate (LiPF$_6$) dissolved in a carbonic ester base organic solvent such as ethylene carbonate.

The positive-electrode external terminal exposure portion 14 and the negative-electrode external terminal exposure portion 12 each include a welding joint welded to a bus bar or the like. The welding joint has a flat side disposed upward from the gasket 5 and in parallel to the outside surface of the battery lid 6. The flat side is brought into plane contact with bus bar or the like and welded thereto.

A negative electrode connector 12a and a positive electrode connector 14a are shaped like cylinders which are projected from respective lower sides of the negative-electrode external terminal exposure portion 12 and the positive-electrode external terminal exposure portion 14, and distal ends of which are respectively insertable in a negative-electrode through hole 26 and a positive-electrode through hole 46 of the battery lid 6. The negative electrode connector 12a and the positive electrode connector 14a penetrate the battery lid 6, protruding further into the battery case 1 beyond a negative-electrode current collector plate base 21 of the negative-electrode current collector plate 24 and a positive-electrode current collector plate base 41 of the positive-electrode current collector plate 44. The negative electrode connector and the positive electrode connector have their distal ends crimped so as to integrally secure the negative-electrode external terminal exposure portion 12 and the positive-electrode external terminal exposure portion 14, and the negative-electrode current collector plate 24 and the positive-electrode current collector plate 44 to the battery lid 6. The gasket 5 is interposed between the negative-electrode external terminal exposure portion 12 and the battery lid 6 and between the positive-electrode external terminal exposure portion 14 and the battery lid 6. The insulating plate 7 is interposed between the negative-electrode current collector plate 24 and the battery lid 6 and between the positive-electrode current collector plate 44 and the battery lid 6. The negative-electrode current collector plate base 21 and the positive-electrode current collector plate base 41 are respectively formed with a negative-electrode aperture 23 and a positive-electrode aperture 43 for insertion of the negative electrode connector 12a and the positive electrode connector 14a.

The positive-electrode current collector plate 44 and the negative-electrode current collector plate 24 respectively include a positive-electrode connector end 42 and a negative-electrode connector end 22 which extend along the wide side surface 1b of the battery case 1 toward the bottom surface 1d thereof so as to be connected to the positive-electrode foil exposure portion 34c and the negative-electrode foil exposure portion 32c in an opposed and overlapped relation.

The insulating protection film 2 is wound around the wound (electrode) group 3. The central axis of the insulating protection film extends along a flat surface of the wound (electrode) group 3 and perpendicular to the direction of the winding axis of the wound (electrode) group 3. The insulating protection film 2 is composed of a single sheet member or plural sheet members made of a synthetic resin such as pp (polypropylene). The insulating protection film is long enough to be wound about a winding center parallel to the flat surface of the wound (electrode) group 3 and perpendicular to the winding axis.

Figure 4:
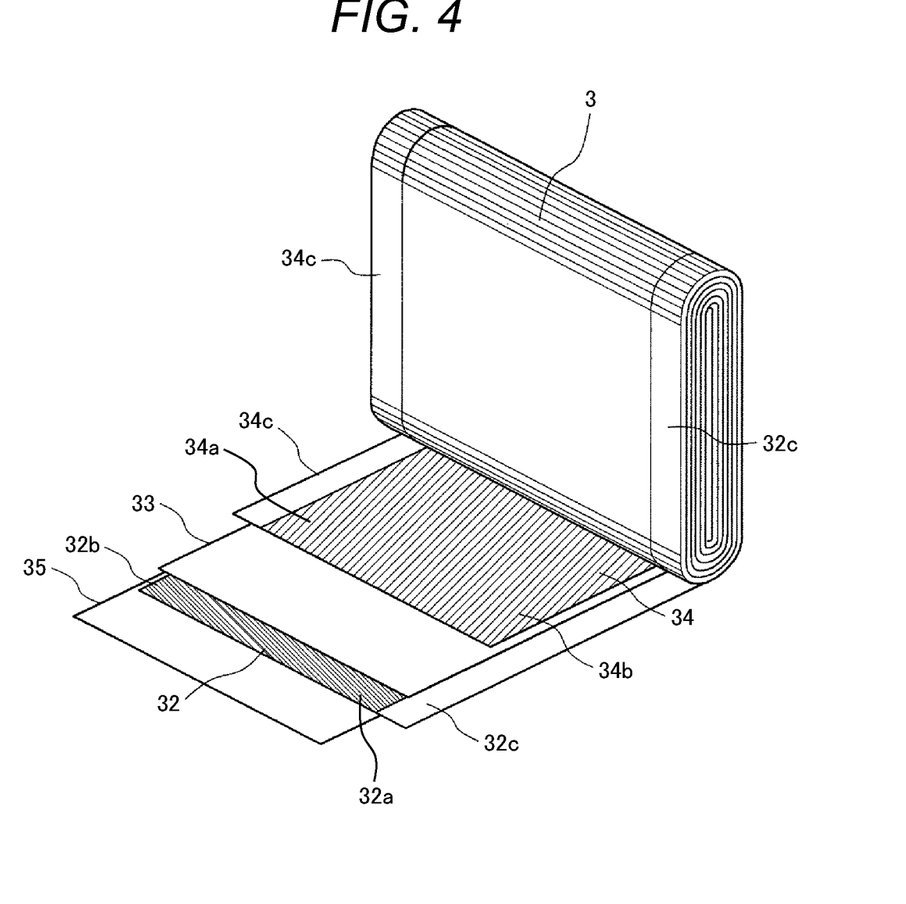
FIG. 4 is a disassembled perspective view of a wound electrode group.

FIG. 4 is a disassembled perspective view showing an unfolded part of the wound electrode group.

The wound (electrode) group 3 is formed by winding a negative electrode 32 and a positive electrode 34 into a flat configuration with separators 33, 35 interposed therebetween. In the wound (electrode) group 3, the negative electrode 32 is an outermost circumferential electrode. The separators 33, 35 are wound on the outer side of the negative electrode. The separators 33, 35 have a role to provide isolation between the positive electrode 34 and the negative electrode 32.

A portion of the negative electrode 32 that is coated with a negative electrode mixture layer 32b is laterally larger than a portion of the positive electrode 34 that is coated with a positive electrode mixture layer 34b. Thus, the portion coated with the positive electrode mixture layer 34b is configured to be necessarily held between the portions coated with the negative electrode mixture layer 32b. The positive-electrode foil exposure portions 34c and the negative-electrode foil exposure portions 32c are respectively bound together at planar portions and connected by welding or the like. Incidentally, the separator 33, 35 is laterally larger than the portion coated with the negative electrode mixture layer 32b. However, the separator is wound at place allowing the exposure of a metal foil surface at an end of the positive-electrode foil exposure portion 34c or the negative-electrode foil exposure portion 32c. Therefore, the separator does not interfere with binding and welding together the exposure portion.

The positive electrode 34 includes a positive-electrode active-material mixture on both sides of a positive electrode foil 34a as a positive-electrode current collector. The positive electrode is provided with the positive-electrode foil exposure portion 34c without the coat of the positive-electrode active-material mixture at one lateral end of the positive electrode foil. The negative electrode 32 includes a negative-electrode active-material mixture on both sides of a negative electrode foil 32a as a negative-electrode current collector. The negative electrode is provided with the negative-electrode foil exposure portion 32c without the coat of the negative-electrode active-material mixture at the other lateral end of the negative electrode foil. The positive-electrode foil exposure portion 34c and the negative-electrode foil exposure portion 32c are regions where a metal surface of the electrode foil is exposed. The electrodes are wound in a manner that the positive-electrode foil exposure portion and the negative-electrode foil exposure portion are located on one side and the other side of the electrode foil with respect to the direction of winding axis.

As for the negative electrode 32, a negative electrode mixture was prepared by adding 10 parts by weight of polyvinylidene fluoride (hereinafter, referred to as "PVDF") as a binder to 100 parts by weight of amorphous carbon powder as a negative electrode active material, and further adding N-methylpyrrolidone (hereinafter, referred to as "NMP") as a dispersant, followed by kneading the mixture. The negative electrode mixture was coated on the both sides of a 10 µm-thick copper foil (negative electrode foil) except for a welding portion (negative-electrode uncoated portion). Subsequently, the negative electrode 32 including a negative-electrode material coat portion having a thickness of 70 µm exclusive of the copper foil was obtained through drying, pressing and cutting steps.

While the embodiment illustrates the case where the amorphous carbon is used as the negative electrode active material, the present invention is not limited to this. Examples of other usable material include natural graphite capable of insertion/desorption of lithium ions, a variety of artificial graphite materials, carbonaceous materials such as coke, chemical compounds based on Si or Sn (such as SiO and $TiSi_2$), and composite materials thereof. Further, the particle configurations of such materials are not particularly limited and can include scale shapes, spherical shapes, fibrous shapes, massive shapes and the like.

As for the positive electrode 34, a positive electrode mixture was prepared by adding 10 parts by weight of scale-shaped graphite as a conductive material and 10 parts by weight of PVDF as the binder to 100 parts by weight of lithium manganate (chemical formula: $LiMn_2O_4$) as a positive electrode active material, further adding NMP as a dispersant, followed by kneading. The positive electrode mixture was coated on the both sides of a 20 µm-thick aluminum foil (positive electrode foil) except for a welding portion (positive-electrode uncoated portion). Subsequently, the positive electrode 31 including a positive-electrode material coat portion having a thickness of 90 µm exclusive of the copper foil was obtained through drying, pressing and cutting steps.

The embodiment illustrates the case where lithium manganate is used as the positive electrode active material. However, other lithium manganates having spinel crystal structure, lithium manganate composite oxides partly substituted with or doped with metallic element, lithium cobaltite and lithium titanate having lamellar crystal structure, and lithium-metal composite oxides partly substituted with metal element or doped with metal element are also usable.

The embodiment illustrates the case where PVDF is used as the binder for the coated portion of the positive electrode and the negative electrode. Examples of other usable binders include: polymers of polytetrafluoroethylene (PTFE), polyethylene, polystyrene, polybutadiene, butyl rubber, nitrile rubber, styrene-butadiene rubber, polysulfide rubber, nitrocellulose, cyanoethyl cellulose, latexes, acrylic nitrile, vinyl fluoride, vinylidene fluoride, fluorinated propylene, fluorinated chloroprene, acrylic resins and the like; and mixtures thereof.

An example of a material usable as a winding core is a resin sheet having higher flexural rigidity than any of the positive electrode foil, the negative electrode foil, and the separators 33, 35. The resin sheet is wound in a roll as the winding core.

In the configuration of the above-described electric storage device (secondary battery 100), the positive-electrode external terminal exposure portion 14 and the negative-electrode external terminal exposure portion 12 constitute the fastening member 70; the battery lid 6, the positive-electrode current collector plate 44, the negative-electrode current collector plate 24 and the insulating plate 7 constitute the fastened member 80; and the gasket (insulation member) 5 constitutes the resin member 90 interposed between the fastening member 70 and the fastened member 80. Just as described in the first embodiment, the following effects are obtained. Due to the action of the slight compression region compressed by the projection 60, the gasket (insulation member) 5 compressed by the compression region 72 is prevented from being displaced outward in the radial direction with respect to the axis of the penetrating portion 66. Hence, the gasket (insulation member) 5 is held in close contact with the fastening member 70 and the battery lid 6 so that the adequate sealing area is secured.

Example 2

Figure 5:
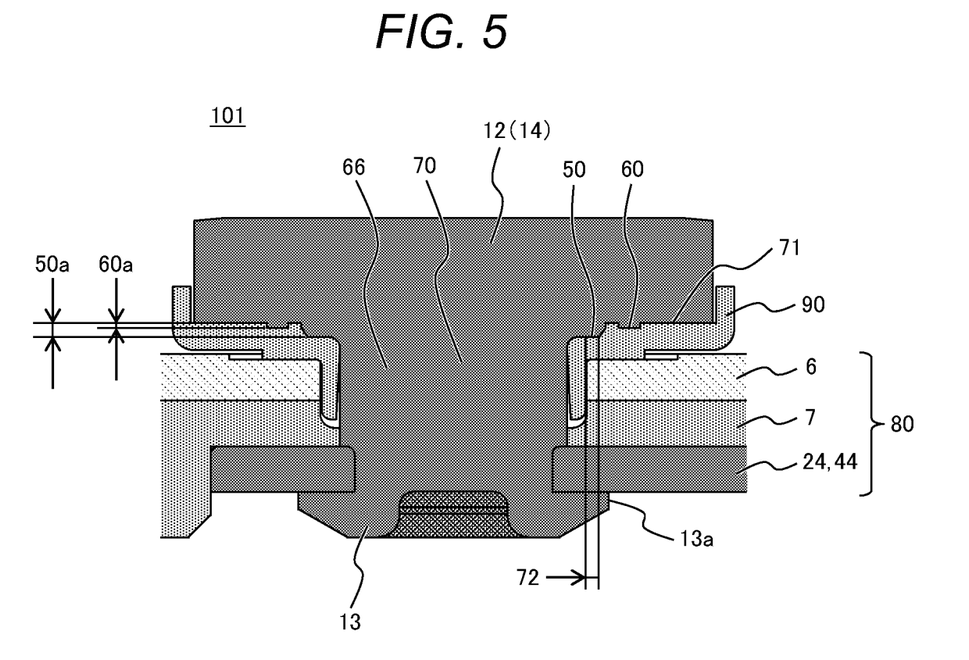
FIG. 5 is a sectional view of a fastening structure according to Example 2 hereof.

FIG. 5 illustrates an example where the projection 60 is disposed at the exposure portion 12 (14).

While the projection 60 is disposed at the outside surface of the fastened member 80 (lid (battery lid) 6) in Example 1, the projection may be disposed at the exposure portion 12 (14) as shown in FIG. 5.

In this case as well, the projection height 60a is lower than the compression projection height 50a of the compression projection 50 just as in Example 1. This configuration is adapted to generate the sealing effect by the compression region 72 and to cause the projection 60 to prevent the material-thickness decrease of the resin member 90.

While Examples 1 and 2 illustrate the fastening structure 101 which includes the compression projection 50 at the fastening member 70, the present invention is not limited to this configuration. The compression projection 50 need not be disposed at the fastening member 70. A similar effect can be obtained if the compression projection 50 is disposed at the lid (battery lid) 6.

In the light of the adequate sealing area, it is more preferred that the compression projection 50 and the projection 60 are disposed at different members as illustrated by Example 1. In some cases, however, the compression projection and the projection are more preferably disposed at the same member from the standpoint of components processing.

Up to this point, the embodiments according to the present invention have been specifically described, but the present invention is not limited to the aforementioned embodiments and various changes in design can be made without departing from the spirit of the present invention. The foregoing embodiments, for example, are the detailed illustrations to clarify the present invention. The present invention is not necessarily limited to those including all the components described above. One component of one embodiment can be replaced by one component of another embodiment. Further, one component of one embodiment can be added to the arrangement of another embodiment. A part of the arrangement of each embodiment permits addition of some component of another embodiment, the omission thereof or replacement thereof.

REFERENCE SIGNS LIST

1 . . . battery case
1a . . . aperture
1b . . . wide side surface
1C . . . narrow side surface
1d . . . bottom surface
2 . . . insulating protection film
3 . . . wound electrode group (electric storage device)
5 . . . gasket (resin member 90)
6 . . . lid (battery lid)
7 . . . insulating plate
9 . . . liquid injection port
10 . . . gas exhaust valve
11 . . . liquid tap
12 . . . negative-electrode external terminal exposure portion (exposure portion)
12a . . . negative electrode connector
13 . . . crimp portion
13a . . . end of crimp portion
14 . . . positive-electrode external terminal exposure portion (exposure portion)
14a . . . positive electrode connector
21 . . . negative-electrode current collector plate base
22 . . . negative-electrode connector end
23 . . . negative-electrode aperture
24 . . . negative-electrode current collector plate
26 . . . negative-electrode through hole
32 . . . negative electrode
32a . . . negative electrode foil
32b . . . negative electrode mixture layer
32c . . . negative-electrode foil exposure portion
33 . . . separator
34 . . . positive electrode
34a . . . positive electrode foil
34b . . . positive electrode mixture layer
34c . . . positive-electrode foil exposure portion
35 . . . separator
41 . . . positive-electrode current collector plate base
42 . . . positive-electrode connector end
43 . . . positive-electrode aperture
44 . . . positive-electrode current collector plate
46 . . . positive-electrode through hole
50 . . . compression projection
50a . . . compression projection height
60 . . . projection
60a . . . projection height
66 . . . penetrating portion
70 . . . fastening member (negative-electrode external terminal exposure portion 12, positive-electrode external terminal exposure portion 14)
71 . . . confronting surface
72 . . . compression region
80 . . . fastened member
90 . . . resin member
100 . . . secondary battery
101 . . . fastening structure

The invention claimed is:

1. A fastening structure comprising:
a fastened member;
a fastening member extending through a through hole formed in the fastened member; and
an insulation member interposed between the fastening member and the fastened member,
wherein the fastening member includes an exposure portion exposed from the fastened member, and a penetrating portion extending through the through hole,
the exposure portion includes a confronting surface opposed to an outside surface of the fastened member via the insulation member,
a compression region defining a minimum distance between the confronting surface and the outside surface, wherein the compression region is provided at one location between the confronting surface and the outside surface,
a projection projecting a first distance from the confronting surface toward the outside surface or projecting the first distance from the outside surface toward the confronting surface, wherein the projection is disposed at a place where there is no overlapping with the compression region and the first distance is less than than a compression projection distance of the compression region.

2. A secondary battery comprising:
a battery case accommodating an electric storage device;
a battery lid for closing the battery case; and
the fastening structure according to claim 1,
wherein the fastening structure is disposed at the battery lid,
the fastened member includes at least the battery lid, and
the fastening member is an external terminal for electrically interconnecting the electric storage device and an outside of the battery case.

3. The secondary battery according to claim 2, further comprising:
a current collector plate for interconnecting the external terminal and the electric storage device, and
an insulating plate disposed between the current collector plate and the battery lid,
wherein the fastened member includes the battery lid, the insulating plate, and the current collector plate.

4. The secondary battery according to claim 3,
wherein the external terminal includes a crimp portion for crimping the fastened member in the battery case,
the exposure portion and the crimp portion extend outward beyond the penetrating portion in a radial direction with respect to the axis of the penetrating portion,
the crimp portion is connected to the current collector plate, and
the fastened member is held between the exposure portion and the crimp portion.

5. The secondary battery according to claim 4,
wherein the compression region is located at place inward from an end of the crimp portion in the radial direction with respect to the axis of the penetrating portion.

6. The secondary battery according to claim 5,
wherein the projection is disposed at place outward from the compression region in the radial direction.

7. The secondary battery according to claim 6,
wherein the projection is disposed at place outward from the end of the crimp portion in the radial direction.

\* \* \* \* \*